April 27, 1937.  E. H. LOCKWOOD, 2D  2,078,675
HEATER CONTROL SYSTEM
Filed Oct. 27, 1934
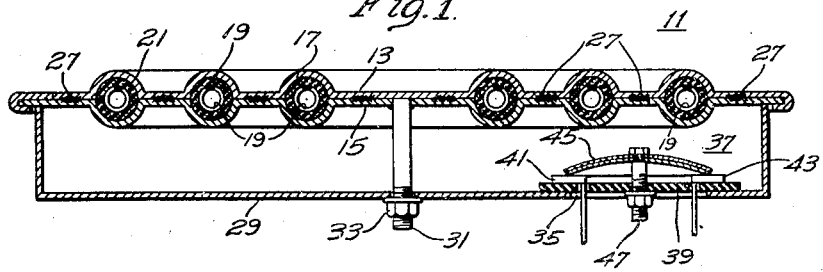
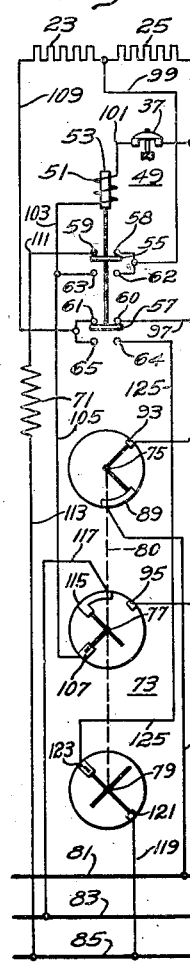
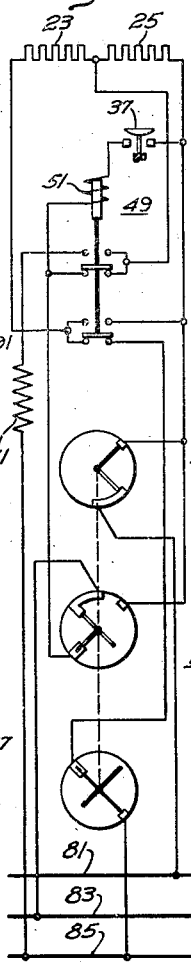
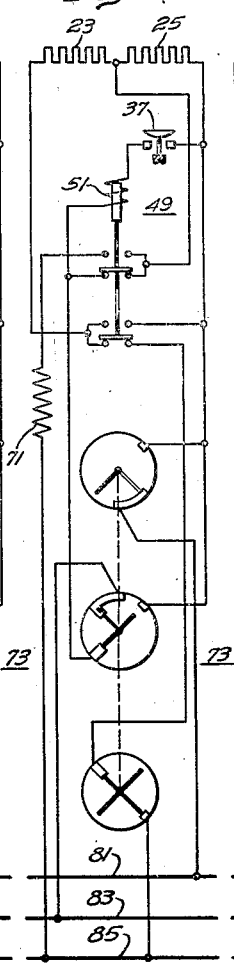
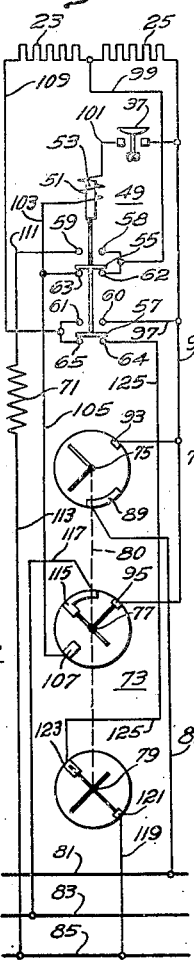
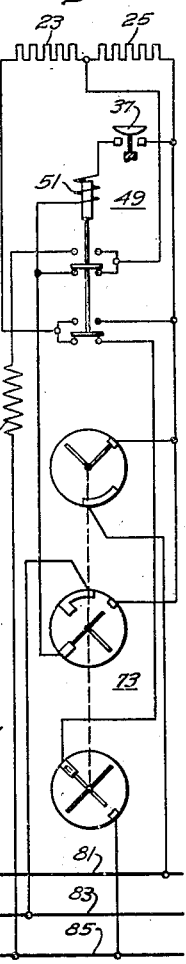
WITNESSES:
INVENTOR
Edwin H. Lockwood.
BY
ATTORNEY Patented Apr. 27, 1937

2,078,675

UNITED STATES PATENT OFFICE 2,078,675

HEATER CONTROL SYSTEM

Edwin H. Lockwood, II, Mansfield, Ohio, assignor to Westinghouse Electric & Manufacturing Company, East Pittsburgh, Pa., a corporation of Pennsylvania Application October 27, 1934, Serial No. 750,291

6 Claims. (Cl. 219—20)

My invention relates to electric heaters, and particularly to control systems therefor.

An object of my invention is to provide a relatively simple and inexpensive system of control for an electric heater that shall permit of effecting quick initial heating thereof.

Another object of my invention is to provide a thermal control system for a plural-section electric heater that shall be so thermally controlled by the heater as to cause the sections thereof to be traversed by a larger-than-normal current during the heating-up period, and by a normal current thereafter.

Another object of my invention is to provide a thermal control system for an electric heater that shall effect a quick heating-up thereof to a predetermined heater temperature, and shall effect a change of electrical connections after said temperature value has been reached, said changed electric connections being maintained irrespective of a later temperature reduction of the heater while in operation.

Other objects of my invention will either be specifically pointed out hereinafter, or will be apparent from a description of a system embodying my invention.

In practicing my invention, I provide a plural-section heating element which may be of the general kind used in electric stoves or ranges, and a current-limiting resistor together with a three-heat snap-switch of the usual kind now employed to vary the electrical connections to the respective sections, and add to said system a plural position, plural-contact electromagnetic switch and a thermostatic switch subjected to heat from the heating unit and having a relatively large temperature differential of operation between its two opposed limiting operative positions.

In the single sheet of drawings:

Figure 1 is a view in vertical section, taken through one form of plural-section electric heating unit with which the control system embodying my invention may be operatively associated;

Fig. 2 is a diagram showing the connections of the system embodying my invention during the heating-up period of operation;

Fig. 3 is a view similar to Fig. 2, but showing the connections after the heater temperature has reached a certain value;

Fig. 4 is a diagram showing the connections as modified by the three-heat switch to obtain an intermediate temperature;

Fig. 5 is a diagram showing the connections as modified by the three-heat switch to obtain a low temperature; and, Fig. 6 is a diagram showing the connections of the system when the same has been deenergized by the three-heat switch.

Increasing demands have been made by users of electric heating and, particularly, cooking appliances for a quicker temperature rise in the heating element, so that such heating elements may be comparable, as to speed of heating-up, with the ordinary gas heater. It is obvious that one method of increasing the rate of initial heating of an electric heating unit is to reduce its thermal mass, so that a relatively small amount only of the heat will be stored therein. Another method of increasing the initial temperature rise in a given time is to so arrange the connections or to provide a control system for the electrical heater as will cause a larger-than-normal current value to traverse the heater during the initial period of operation until a certain temperature has been reached whereafter the normal current or a selectively controlled current will be caused to traverse the heating unit.

Referring first to Fig. 1 of the drawing, I have there shown one form of heating unit 11, particularly adapted to be used in cooking appliances and comprising an upper relatively thin sheet metal plate 13, a lower thin sheet metal plate 15, each of these plates having cooperating substantially semi-circular grooves 17 therein, any desired number of such grooves being provided, and the grooves in the plates being so located as to cooperate with each other substantially as shown in Fig. 1 of the drawing. A plural section heating element comprising helically wound resistor wire 19 is insulatedly located in the substantially circular grooves, the electric insulating material 21 being located around said helix 19, so as to extend between it and the inner walls of the semi-circular grooves 17 of the respective plates. I provide two sections 23 and 25 of resistor wire 19 (see Fig. 2 of the drawing) for a purpose that will hereinafter appear, such sections being now well known in the art.

The granular electric insulating material 21 may be generated by the method disclosed and claimed in United States Reissue Patent 16,340 to C. B. Backer. This method may be briefly described as follows. The resistor helix 19 is surrounded by an open helix of initially metallic magnesium ribbon which is subjected to the action of high temperature steam whereby the initially metallic magnesium is converted into magnesium hydroxide, which is then heated to change the hydroxide into an oxide.

The two plates 13 and 15 may be spot welded, as shown at 27, at a plurality of points over the periphery of the two plates and between the grooves and outside of the same, and the upper plate may have its outer peripheral edge return-bent tightly around and over the periphery of the lower plate to provide a strong substantially flat heating unit. While no terminals have been shown, these have been omitted for the sake of clearness, and it is to be understood that a plurality of such terminals are provided in a manner well known in the art.

I provide further, a bottom dished casing 29 adapted to be held against the lower face of the heating unit 11, as by a central clamping bolt 31, and a nut 33 thereon.

The bottom wall of casing 29 is provided with an opening 35 therein at one side thereof to receive a thermostat 37 which thermostat may comprise a suitable base 39, which may be made of electric-insulating material, having a pair of contact terminals 41 and 43 mounted thereon, and a snap-acting bimetal disc 45 supported from the base by a stud 47 extending centrally of the disc 45 to loosely support the same, and permit it to take either one of two opposed limiting positions, one of which is shown in Fig. 1 of the drawing, where the circuit controlled by the thermostat is closed. The design and construction of the bimetal disc 45 is that disclosed and claimed in Patent No. 1,448,240 to J. A. Spencer. The main characteristic of such a bimetal disc is that it has a relatively large temperature differential of operation, that is, the temperature of the ambient medium affecting the bimetal disc must vary through a large value before the disc will move from one of its operative positions to its other operative position. For illustrative purposes, I may mention that I prefer to have the disc 45 so designed and constructed that the temperature at which it will move from the position shown in Fig. 1 of the drawing to its open position, where it will be dished in the other direction, may be on the order of 350 to 400°, and that it will not reclose until the temperature drops to a value comparable to or on the order of room temperature, or only slightly above such value, that is, 100° F. to 200° F.

Referring now to Fig. 2 of the drawing, I have there illustrated the two sections 23 and 25 of the heater schematically, and have also shown an electromagnetic switch 49 comprising an energizing coil 51, a core 53 energizable thereby, two contact bridging members 55 and 57, moved by the core 53 into either one of two opposed limiting positions. The members 55 and 57 when moved to their upper positions, engage fixed contact members 58 and 59 and 60 and 61, respectively, and may engage contact members 62 and 63 and 64 and 65, respectively, when in their lowermost position.

I provide further a current limiting resistor or reactor 71, the connections of which in the circuit will be hereinafter set forth in detail. I provide further a three-heat snap-switch 73 of a kind now well known in the art and embodying a plurality of superposed, coaxial contact members 75, 77 and 79 mounted on a common shaft 80 and cooperating with a plurality of fixed contact terminals, the whole structure being effective to vary the connections of the two sections 23 and 25 of the electrical heater to an electrical supply circuit to obtain three different degrees of heat, as well as to fully deenergize the heating units, in a manner well known in the art, and as will be hereinafter set forth. I provide, preferably, but not necessarily, a three-wire supply circuit including supply circuit conductors 81, 83 and 85, there being a voltage difference of 110 volts between neutral conductor 83 and the outer conductors 81 and 85, respectively, while a potential difference of 220 volts may exist between conductors 81 and 85. While I have mentioned certain potential difference, I do not desire to be limited thereto since these are mentioned only for the purposes of setting forth the general characteristics of the supply circuit.

Supply circuit conductor 81 is connected by a conductor 87 to a contact member 89 of switch 73. A conductor 91 connects terminal 93 and terminal 95 of switch 73 to the outer terminal of section 25 and a conductor 97 connects conductor 91 to terminal 60 of contactor 49. The inner terminals of the two sections 23 and 25 are connected together and their junction is connected by conductor 99 to the two fixed terminals 58 and 62 of switch 49. One contact member of the thermostat 37 is connected to conductor 91, while the other terminal thereof is connected through a conductor 101 to one terminal of coil 51 while the other terminal thereof is connected by a conductor 103 to terminal 83, which terminal is further connected by a conductor 105 to terminal 107 of switch 73. The outer terminal of section 23 is connected by conductor 109 to terminals 61 and 65 of switch 49. One terminal of the current limiting resistor 71 is connected by a conductor 111 to contact terminal 59 of switch 49, while the other terminal of resistor 71 is connected by a conductor 113 to supply circuit conductor 85.
A contact terminal 115 on switch 73 is connected by a conductor 117 to supply circuit conductor 83. Supply circuit conductor 85 is connected through a conductor 119 to a contact terminal 121 on switch 73, while another contact terminal 123 is connected by a conductor 125 to terminal 64 of electromagnetic switch 49.

Fig. 2 of the drawing shows the electrical connections as they exist at the time of initial energization of the heating element comprising the sections 23 and 25 as by an operator having moved the snap-switch 73 so that the respective fixed and movable contact members thereof occupy the positions shown in Fig. 2 of the drawing. Since the temperature of the heating element 11 is relatively low, disc 45 will be in its closed position, substantially as shown in Fig. 1 of the drawing, so that it will establish an energizing circuit through coil 51 which may be traced as follows: from supply circuit conductor 81, through conductor 87, contact terminal 89, connector 75, terminal 93, conductor 91, thermostat 37, conductor 101, coil 51, conductor 103, conductor 105, terminal 107, connector 77, terminal 115, and through conductor 117 to the neutral supply circuit conductor 83. The electromagnetic switch will, therefore, be in the position in Fig. 2 of the drawing, whereby the following connections are established as regards sections 25 and 23 of the heating unit 11: from supply circuit conductor 81, through conductor 87, terminals 89 and 93 of switch 73, conductor 91 through section 25, conductor 99, contact 58, bridging member 55, contact 59, conductor 111, current limiting resistor 71, and conductor 113 to supply circuit conductor 85. At the same time, section 23 is connected in parallel circuit relation with section 25 by a branch circuit including conductor 97, contact 60, a bridging member 57, contact 61, conductor 109, through section 23 and from there through the rest of the circuit hereinbefore set forth including the current limiting resistor 71. The two sections 23 and 25 are, therefore, connected in parallel circuit relation relatively to each other and in series with a current limiting resistor. It may be here mentioned that I prefer to make the value of the ohmic or inductive resistance of resistor 71 such that when the two sections 23 and 25 are connected in parallel and in series with resistor 71, the current traversing the two sections or the sections individually may be on the order of 2½ to 3 times normal current value.

This larger-than-normal current causes a relatively quick heating-up of the heating unit 11, and at a certain temperature which, as has already been set forth, may be on the order of 350° to 400° F., the disc 45 will be moved to its open position, whereby the energizing circuit through coil 51 is interrupted and the bridging members 55 and 57 will be caused to move to their lower operative positions, substantially as shown in Fig. 3 of the drawing.

Briefly, the connections now in effect are such, as will be noted by a study of Fig. 3 of the drawing, that the two sections 23 and 25 of the heating element are connected in series across supply circuit conductors 81 and 85, the current limiting resistor 71 being now cut out of circuit or rendered inoperative.

Referring now to Fig. 4 of the drawing, I have there illustrated the position of the respective component parts of the three-heat snap-switch 73, which will be occupied when an operator has moved the snap-switch to a second operative position, and a study of the diagram of Fig. 4 will show that section 23 is now connected alone across 110 volts. As compared to the amount of heat generated by heating unit 11 when the control system associated therewith was in the positions shown in Fig. 3 of the drawing, an intermediate heat only is obtained since only one of the two sections is energized.

Fig. 5 of the drawing shows the control system when the switch 73 has been moved by an operator to a third energizing position in which, as will be seen by a study of this figure of the drawing, the two sections 23 and 25 are connected in series circuit relation relatively to each other and across supply circuit conductors 83 and 85. This provides what is usually called a "low" heat.

Fig. 6 of the drawing shows the connections of the control system, and particularly of the snap-switch 73 when the snap-switch has been moved to a position to completely deenergize the heating unit comprising the sections 23 and 25.

The control system embodying my invention thus provides means including a plural contact, plural position relay or electromagnet switch controlled by a thermostat having a large temperature differential of operation, whereby the two sections of a plural switch heating unit are electrically connected in parallel with each other, and in series with a current limiting resistor to thereby effect the expenditure of more than the normal amount of electric energy in the heating unit during the heating-up period, whereby said period is greatly decreased in length. Upon the heating unit reaching a predetermined temperature, the thermostat effects a change in the electrical connections, whereby current of a normal value is caused to traverse the heating unit, the electrical connections to the energizing circuit remaining the same, or in other words, the voltage applied to the system remains constant.

The thermostatic control element will remain in its open position, once it has been moved into such position, irrespective of a reduction in the temperature of the heating unit itself, such as may be caused by actuation of the three-heat snap-switch by an operator until the temperature of the heating unit has reached a value substantially on the order of room temperature. This ensures that the control system will not be moved into the positions shown in Fig. 2 of the drawing, that is, to cause a larger-than-normal current to traverse the heating unit until the heating unit is again to be energized under such conditions that it will cause a quick heating-up thereof.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. In a control system for a plural section heating unit, in combination, an auxiliary resistor, a plural contact plural position relay and a thermostat located in heat receiving relation to the heating unit and controlling the relay to connect the sections of the heating unit in parallel, and in series with the auxiliary resistor, when starting cold and to connect the sections in series and to cut the auxiliary resistor out of circuit when a certain temperature of the heating unit is reached and to prevent reconnection in parallel until the heating unit has cooled to substantially room temperature.

2. A control system for a plural section heating unit comprising, in combination, with said heating unit, a three heat manually-actuable switch controlling the connections of the heating unit to an energizing circuit, a plural contact electromagnetic relay, a thermostat located in heat receiving relation to the heating unit, a current limiting auxiliary resistor and electric connections between the heating unit, thermostat, relay coil, relay contacts, switch and auxiliary resistor to cause the sections of the heating unit to be connected in parallel with each other and in series with the auxiliary resistor to an energizing circuit as long as the temperature is below a certain maximum value and to cause the sections to be connected in series circuit with each other and to an energizing circuit at all temperatures above said maximum value.

3. A control system comprising, in combination, a plural-section heating unit, a current limiting resistor, a plural-position plural-contact electromagnetic switch, a thermostat in heat-receiving relation to the heating unit and having a large temperature differential of operation and electric connections between the heating unit, the current limiting resistor, the electromagnetic switch and the thermostat to cause the thermostat to control the electromagnetic switch to connect the sections of the heating unit in parallel with each other and in series with the current limiting resistor when the system is first energized to effect quick temperature rise of the heating unit up to a predetermined temperature value, to then effect connection of the sections of the heating unit in series with each other and to cut the current limiting resistor out of circuit and to maintain said series connection of the sections of the heating unit down to a value of heating unit temperature on the order of room temperature.

4. A control system comprising, in combination, a plural-section heater, a three-heat switch for the heater, a current-limiting resistor, an electromagnetic switch, a thermostat thermally affected by the heater and having a large temperature differential of operation and electrical connections between the heater, the current-limiting resistor, the three-heat switch, the electromagnetic switch and the thermostat to cause the thermostat to control the electromagnetic switch to connect the sections of the heater in parallel with each other and in series with the current limiting resistor when first energizing the system, and up to a predetermined value of heater temperature and to then connect the sections in series with each other and cut out the current limiting resistor and to maintain said latter connection at all temperatures of the heater down to substantially room temperature and irrespective of operation of the three heat switch to all but two of its circuit closing positions.

5. A control system comprising, in combination, a plural section heater, a current limiting resistor, an electromagnetic switch for the heater, a thermostat thermally controlled by the heater, having two opposed limiting positions, and moving from one to the other of said positions with a snap action and as a result of a variation of temperature of the heater of at least 100° C., said thermostat controlling the electromagnetic switch to connect the sections of the heater in parallel and the current limiting resistor in series therewith to cause a higher-than-normal current to traverse the heater sections until the heater temperature reaches a certain value and to then control the electromagnetic switch to connect in circuit the heater sections only, said sections being connected in series, to cause normal current to traverse the sections.

6. A control system comprising, in combination, a plural-section heater, a current limiting resistor, an electromagnetic switch, a thermostat affected by the heater temperature, a supply circuit and electrical connections between the heater sections, the current limiting resistor, the electromagnetic switch, the thermostat and the supply circuit, the thermostat controlling the electromagnetic switch to connect a circuit comprising the sections of the heater in parallel and the current limiting resistor in series therewith to the supply circuit to cause a higher-than-normal current to traverse the heater sections until the heater temperature reaches a certain value and to then control the electromagnetic switch to connect the heater sections only to the supply circuit, said sections being connected in series, to cause normal current to traverse the heater sections, the thermostat maintaining said last-named connection until the heater temperature drops to a value on the order of room temperature.

EDWIN H. LOCKWOOD, II.